United States Patent [19]

Adell

[11] Patent Number: 4,547,994

[45] Date of Patent: Oct. 22, 1985

[54] METAL AND PLASTIC EDGE GUARD

[75] Inventor: Robert Adell, Sunnyvale, Tex.

[73] Assignee: U.S. Product Development Company, Sunnyvale, Tex.

[21] Appl. No.: 561,247

[22] Filed: Dec. 13, 1983

[51] Int. Cl.⁴ .............................................. E05F 7/00
[52] U.S. Cl. .................................. 49/462; 156/244.11
[58] Field of Search ........................ 49/462; 52/716; 156/242, 244.27, 244.11; 264/171, 174, 285, 339

[56] References Cited

U.S. PATENT DOCUMENTS 4,093,499  6/1978  Naka ........................... 156/244.27 X
4,259,812  4/1981  Adell .................................. 52/716 X
4,338,148  7/1982  Adell ................................. 49/462 X Primary Examiner—Kenneth Downey
Attorney, Agent, or Firm—Stephenson & Boller

[57] ABSTRACT

A plastic and metal edge guard as fabricated by extruding plastic onto metal. The extrusion may take place onto a flat metal strip with the plastic and metal subsequently being formed into a desired cross sectional shape for the edge guard. Several embodiments are disclosed. In one embodiment the plastic is provided with a tapered shape so that when the plastic and metal are formed into the U-shaped cross section the plastic taper narrows toward the distal end of the legs to produce a feathering of the plastic. The plastic may cover either the entire surface of one side of the strip or selectively leave one or both marginal edges uncovered on the same side of the strip which can be formed into beads.

4 Claims, 15 Drawing Figures

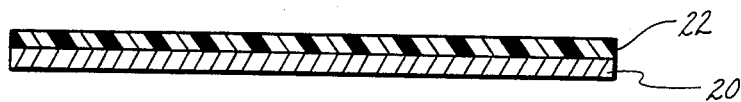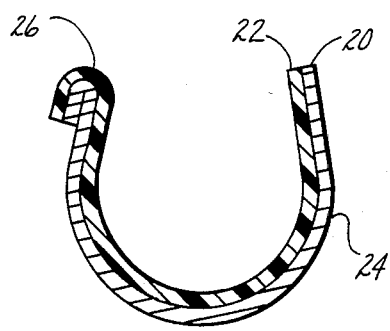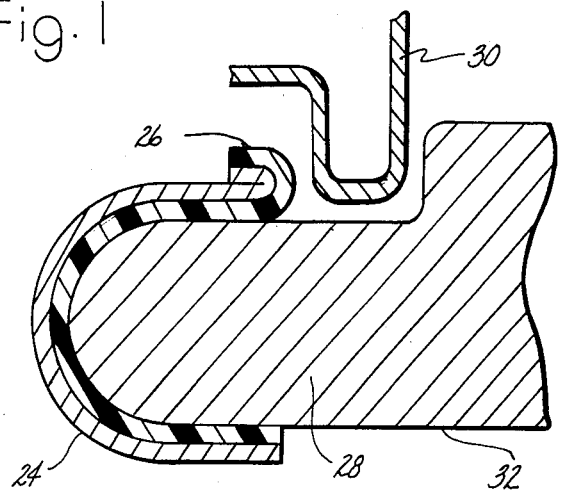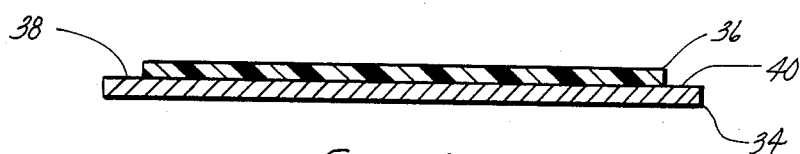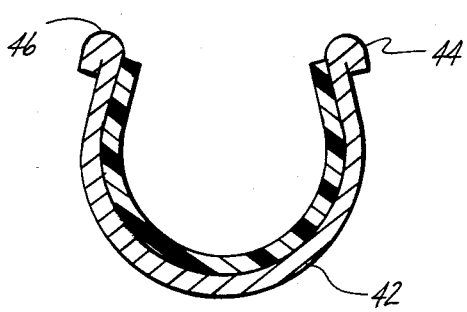

METAL AND PLASTIC EDGE GUARD

BACKGROUND AND SUMMARY OF THE INVENTION

This invention relates to edge guards such as those which are applied to the trailing edges of swinging closures in automotive vehicles. These products are referred to in the automotive industry as edge guards or door edge guards.

Various types of edge guards are disclosed in many of applicant's issued U.S. patents as well as certain of his pending U.S. patent applications. By way of example, reference is made to the following issued patents of applicant relating to insulated metal edge guards.

| | | |
|---|---|---|
| 4,259,812 | 4,338,148 | 4,379,376 |
| 4,316,348 | 4,365,450 | 4,379,377 |
| 4,334,700 | 4,377,056 | 4,387,125 |

Insulated metal edge guards pioneered by applicant have been accepted by the automobile industry and recognized as providing a new and improved product over prior edge guards. While applicant's edge guards afford a number of different types of improvements, perhaps the most significant one is the generic feature of essentially eliminating the possibility of galvanic action (i.e. rusting) occuring between metal of the edge guard and the metal of the door or other object onto which the edge guard is installed. This helps the automobile manufacturers achieve their desired objectives of improving the quality, appearance and life of their products.

Now that new car purchasers are keeping their cars longer because of the very high cost of new cars, it is in the automobile manufacturers' interest to provide products which will maintain their appearance longer without unsightly rusting. Not only does this benefit the original owner, but subsequent owners as well because one person's old car may be another person's new one. Applicant's pioneering efforts with insulated door edge guards predate this current trend toward rust prevention.

It should be recognized that a car's door edges are exposed to potential damage at least twice each time the car is occupied and driven, once when the driver gets in and once when he gets out. Hence, door edge guards provide an important protective function, and this is true regardless of the climate conditions in which the car is used. Certainly salt environments are very severe, such as where salt is used to melt road ice and snow, or along the ocean shore lines. Other environments can also contribute toward the tendency to rusting. Even where coal and sand are used, these materials may have a high salt or acid content which promotes rusting.

In furtherance of enabling the automobile manufacturers to improve both their products and their productivity, applicant is continuing to develop new and useful improvements in edge guards, both in the products per se and in the methods of manufacturing same.

The present invention is directed to a further improvement in an edge guard which provides improved characteristics yet which can be economically fabricated in various configurations and yet can provide new and beneficial appearances and ease of installation.

The present invention enables an edge guard to be manufactured which will meet the rigid specifications of automobile companies and with improved productivity.

In prior insulated metal edge guards, it has been necessary to laminate or cast plastic onto metal coils, slit the insulated metal of the coils to desired widths and then roll-form the strips. Where different plastics are involved, not only from the standpoint of the types of plastic materials themselves, but also from the standpoint of colors of the plastics, the manufacturer of an edge guard must inventory a substantial stock of insulated metal in order to meet the demands of automobile companies. With the present invention this is no longer required and hence the invention provides an improved productivity to the ultimate benefit of the consumer. Yet the desired qualities, both decorative and protective, are obtained with an edge guard embodying principles of the invention.

According to one aspect of the invention, plastic material is extruded onto a strip of metal in the flat with the strip of metal having a width corresponding to that which is required to form the cross section of a single edge guard. The plastic material may be applied to the metal strip in a desired pattern covering either the entire width of one side of the strip, or less than the entire width of the strip. Its thickness need not be constant across the width of the strip. The laminate consisting of the extruded plastic on the metal strip is then subsequently processed into a desired cross sectional shape for the edge guard, a U-shaped cross section being representative.

With the plastic being applied to the full width of the strip, the material is formed into a U-shaped cross section to dispose the vinyl on the interior of the U. This provides full insulation when the edge guard is applied onto the edge of a metal object such as the trailing edge of a swinging closure in an automobile. If it is desired to outwardly turn one or both of the distal ends of the legs of the edge guard, a bead or beads may be formed, each of which possesses an exterior appearance consisting of the plastic material and not the metal. This may be deemed desirable to provide a decorative appearance function and/or improved retention force for retaining the edge guard on an edge.

The use of metal can render the edge guard self-retaining so that it may be deemed unnecessary to use separate adhesives applied to the interior of the U-shaped cross section for the purpose of bonding the edge guard onto the edge of the object onto which it is to be installed.

In another embodiment, the plastic material is extruded onto the metal strip so as to cover only a portion of one side of the metal strip leaving one or both longitudinally extending margins on the same side of the strip uncovered. The strip may be then formed into a U-shaped cross section to dispose the insulation on the interior of the U. Like the preceeding embodiment, this can provide a full insulation of the metal of the edge guard from the metal of the edge. This embodiment also provides for the creation of beads at the distal ends of the legs. By leaving one or both longitudinal margins uncovered by plastic, these margins may be turned outwardly to form metal beads so that the beads have an exterior appearance of metal while yet the edge guard provides insulation lining the interior of the U so as to protectively insulate the edge guard from the edge.

According to a still further aspect of the invention, the cross sectional shape of the plastic extruded onto the metal strip may be of non-uniform thickness, for example a tapered thickness. By tapering the thickness such that the edge guard has a narrowing taper toward the longitudinal edges of the metal strip, and then forming the insulated strip into a U-shaped cross section to dispose the insulation on the interior of the U, the insulation is in effect feathered at the distal ends of the legs. This is advantageous in that it can facilitate the installation and retention of an edge guard on an edge while at the same time providing the desired edge guard function with improved protection of the edge from external forces which may be applied through the edge guard.

According to a still further aspect of the invention the material may be first roll-formed into a desired U-shaped cross section and vinyl or plastic material co-extruded onto the U-shaped cross section. This provides for various cross sections which cannot be obtained by extruding material onto the metal strip in the flat. Depending upon the desired exterior appearance, the edge guard may be constructed so that only the metal of the edge guard appears from the exterior, or selectively plastic may appear when beads are formed at the ends of the legs with the plastic appearing on the exterior of the beads. The dimensions and sizes of the edge guard may also be selected in accordance with desired characteristics. By controlling the thickness of plastic extruded onto the metal, it is possible for the plastic to be able to compensate for variances in the thicknesses of the edges onto which the edge guards are to be installed. For example, in the case of automobile doors the thicknesses of doors may depend upon the particular plants at which doors are manufactured due to the possibility of different tooling and different manufacturing procedures being used. By designing the edge guard with a sufficient thickness of insulating material to compensate for differences in thickness of the doors, it is possible for a single edge guard cross section to be compatible with doors manufactured at different manufacturing plants. This improves the productivity of manufacturing operations and facilitates assembly and inventory procedures.

The foregoing features, advantages and benefits of the invention, along with additional ones, will be seen in the ensuing description and claims which should be considered in conjunction with the accompanying drawings. The drawings disclose a preferred embodiment of the invention according to the best mode contemplated at the present time in carrying out the invention.

BRIEF DESCRIPTION OF THE DRAWINGS

FIG. 1 is a transverse cross sectional view through an edge guard of the present invention during one stage of its fabrication.

FIG. 2 is a transverse cross sectional view of an edge guard made from the material illustrated in FIG. 1.

FIG. 3 is a cross sectional view illustrating the edge guard of FIG. 2 applied to the trailing edge of a swinging closure, an automobile door.

FIG. 4 is a transverse cross sectional view similar to FIG. 1 illustrating another embodiment.

FIG. 5 is a transverse cross sectional view of an edge guard formed from the material of FIG. 4.

FIG. 6 is a transverse cross sectional view through another embodiment of the edge guard.

DESCRIPTION OF THE PREFERRED EMBODIMENT

Figure 7:
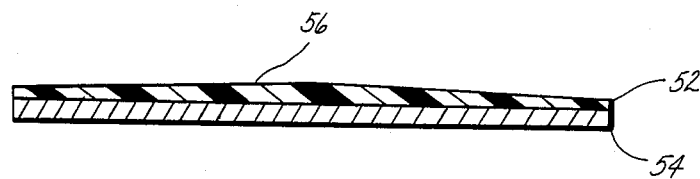
FIG. 7 is a view similar to FIG. 4 illustrating still another embodiment.

FIG. 1 illustrates a transverse cross sectional view through an edge guard during one stage of its fabrication process. FIG. 1 illustrates a flat metal strip 20 onto one surface of which a layer of plastic 22 has been applied. The plastic is applied by passing the metal strip 20 through an extruder, a cross head extruder, and extruding the plastic 22 onto the metal strip as it passes through the extruder. In FIG. 1 it can be seen that plastic 22 and metal strip 20 have the same width so that the plastic material covers one full side of the strip. While any compatible materials may be used for the metal strip 20 and plastic 22, possible materials comprise stainless steel for the metal strip and vinyl for plastic 22. The strip 20 has a width corresponding to that which is needed for making one single edge guard of desired cross section.

FIG. 2 illustrates a final cross sectional shape into which the material of FIG. 1 may be formed. The formation of the material into this generally U-shaped configuration may be accomplished by any suitable means, roll-forming being one example.

The edge guard 24 of FIG. 2 is formed into the U-shaped cross section illustrated such that the plastic insulating material 22 lines the interior of the U. The right hand leg of the edge guard as viewed in FIG. 2 is essentially straight but inclined inwardly toward an imaginary plane bisecting the U-shaped cross section. The left hand leg comprises a beaded distal end 26. The beaded distal end is formed by reverse turning the distal end of the leg outwardly back onto itself in the manner shown.

The formation of a bead at the end of the leg may be deemed desirable for utilitarian and/or decorative purposes. The creation of a bead can yield a stiffening action improving self-retention force. Where the formation of the bead is as shown by the bead 26 in FIG. 2, i.e. outwardly turning the end of the leg back onto itself, the plastic material of insulation 22 will appear as a thin band on the exterior of the leg.

FIG. 3 illustrates the edge guard of FIG. 2 installed on the trailing edge 28 of a swinging closure, for example the trailing edge of an automobile door. The numeral 30 identifies an adjacent body post against which the trailing edge of the closure closes. The illustration of FIG. 3 is intended to be merely representative.

With edge guard 24 installed on the trailing edge of the swinging closure it can be seen that the edge guard has slightly resiliently flexed from the condition of FIG. 2. The metal of the edge guard is effective to exert a self-retention force acting through the insulating plastic whereby the edge guard mounts. Alternatively or additionally however it would be possible to use adhesives or any other suitable means for securing the edge guard onto the door edge. During installation it can be seen that the plastic of the edge guard, and not the metal, abuts the door edge so that the metal of the edge guard is at all times insulated from the edge of the swinging closure 28. The exterior of the door is identified by the number 32 in FIG. 3, and therefore it can be appreciated that the bead 26 is toward the interior. With this construction the metallic appearance of metal 20 is presented to the exterior when the door is closed. By making the metal a decorative one, stainless steel for example, a desired metallic appearance may be imparted to the trailing edge of the swinging closure when the edge guard is installed thereon. Also the edge guard protects the edge from damage which otherwise might occur when the edge strikes an object which may be present in its path of travel. The edge guard protects the painted edge from damage and ensuing problems such as corrosion.

Of course it would be possible to construct the edge guard so that an insulated bead is disposed on the exterior so that when the door is closed the plastic of the insulated bead appears as a thin strip running vertically up and down the end of the outside edge of the edge guard. In certain instances this may be deemed a desirable construction for imparting a desired exterior appearance of plastic having a color contrast with the metal of the edge guard. In this regard, various colorations may be imparted to the plastic material. The characteristics of the plastic may be set as desired whereby it becomes possible for the plastic material to take up variations in thicknesses of door edges. This can be done by varying the dimensions and/or the durometers of the material.

FIG. 4 is a view similar to FIG. 1 illustrating an alternate embodiment. The metal strip is designated by the reference numeral 34 and the plastic by the reference numeral 36. The plastic is applied only to the central region of one side of the metal strip so as to leave uncovered the marginal side edges of the strip 38 and 40 on the same surface as to which the insulating material is applied. The plastic is extruded onto the metal strip as the metal strip is passed through the extruder and conventional procedures for damming or otherwise preventing plastic from co-extruding onto the areas 38 and 40 are employed. For example waxes or other types of material may be applied onto these areas 38 and 40 to prevent the retention of plastic on them and if such materials are used, they may be subsequently removed by conventional procedures if desired. By providing this type of a construction, it is possible to form beads which do not result in plastic appearing on the exterior of the final cross section of the edge guard.

FIG. 5 illustrates an edge guard cross section 42 formed from the material of FIG. 4. Beads 44 and 46 are formed from the uncovered portions 38 and 40 by outwardly turning the side margins of the strip back onto themselves in the manner shown. This construction still leaves the insulating material 36 lining the interior of the U-shaped cross section so as to insulate the metal of the edge guard from the edge of the object onto which it is being installed both during installation and in final installed position. This embodiment may be used where it is deemed desirable to have only a metallic exterior appearance for the edge guard when installed.

FIG. 6 illustrates another cross sectional shape which provides the same insulation characteristics as those of FIG. 2 and FIG. 5. However, in this embodiment the beads are turned inwardly rather than outwardly. The edge of FIG. 6 comprises a metal part 48 and a plastic part 50. Where for whatever reason it is deemed undesirable to extrude the plastic in the flat onto the metal, it is possible for the metal to be first formed to the desired cross section, such as illustrated in FIG. 6, and passed through an extruder with the plastic being extruded in the desired cross sectional shape onto the formed cross sectional shape of the metal strip.

FIG. 7 illustrates another procedure for extruding plastic in the flat onto the metal strip. In this embodiment the metal strip 54 has a width corresponding to that required to form a desired U-shaped cross section of a single edge guard. The strip is passed through the extruder, and the plastic material is extruded onto the full extent of one side of the metal strip. Rather than being of uniform thickness as in FIG. 1 and FIG. 4, the plastic material 52 in FIG. 7 has a tapered cross sectional shape. The maximum thickness is illustrated at the center of the strip by the reference numeral 56 and at this point the thickness narrows uniformly in taper toward each edge of the metal strip. For example, it is possible to fabricate the metal strip as stainless steel 0.012" to 0.015" thickness and with the plastic insulating material having a thickness 12 mills at the center tapering to a thickness of 2 mills at the edges.

Figure 8:
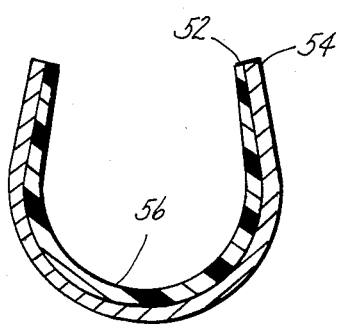
FIG. 8 is a transverse cross sectional view through an edge guard made from the material of FIG. 7.

FIG. 8 illustrates the formation of the material of FIG. 7 into a U-shaped cross section. This U-shaped cross section has the legs tapering slightly inwardly so that when applied onto the door edge a resilient retention force is exerted by the legs so that the edge guard may be made self-retaining. Yet at all times the insulating material lines the interior of the U-shaped cross section. The tapering can facilitate the installation and assembly of the edge guard onto the door edge and it can compensate for thicknesses of variation in the door edge. It also provides protection by shock absorbing impacts imparted to the edge guard.

This illustrated taper is merely representative, and in a general way constitutes a feathering at the ends of the legs. Depending upon the precision of the manufacturing operation other feathering thicknesses are possible.

Figure 9:
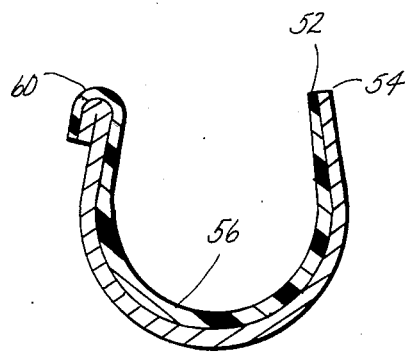
FIG. 9 is a transverse cross sectional view illustrating another embodiment of edge guard.

FIG. 9 illustrates another embodiment of cross section formed from a tapered plastic layer. This embodiment comprises an insulated bead 60 formed on one leg in a similar manner to FIG. 2.

Figure 10:
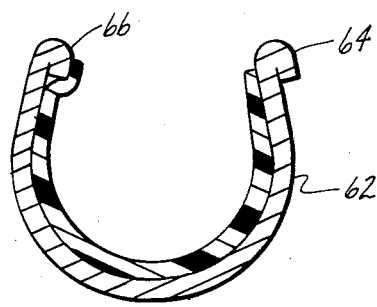
FIG. 10 is a transverse cross sectional view through still another embodiment of edge guard.

FIG. 10 illustrates still another embodiment of cross section 62 in which beads 64, 66 are formed, one inwardly and one outwardly. In FIG. 10 the outwardly turned bead is 64 and the inwardly turned bead 66. The metal may be roll-formed into the desired cross sectional shape as shown including the formation of beads 64 and 66 and the plastic material is then co-extruded into the U-shaped cross section in the manner shown. Depending upon the design and particular manufacturing procedures the thickness of the insulating material may be controlled as desired, either being uniform or non-uniform, for example being tapered. This embodiment, by using two beads, provides for extra retention strength and stiffening, and yet there is no insulation appearing on the exterior. Hence, this cross section may be used where it is desired to have a strictly metallic exterior appearance for the edge guard and stiffening. Moreover, it is possible for either leg to be on the inside and the other on the outside because of the full metallic exterior appearance.

Figure 11:
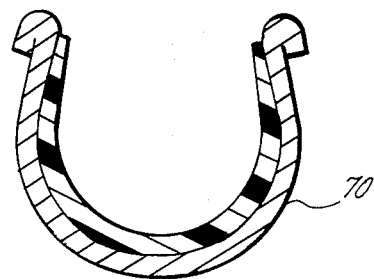
FIG. 11 is a transverse cross sectional view through a further embodiment of edge guard.

FIG. 11 illustrates still another embodiment 70. Embodiment 70 is formed in an analogous manner to FIG. 5, but the embodiment of FIG. 11 is formed from the tapered strip of FIG. 7 whereby the end edges of the insulation of the edge guard are feathered.

Figure 12:
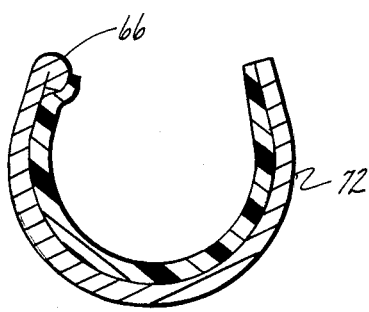
FIG. 12 is a transverse cross sectional view through still another embodiment of edge guard.

FIG. 12 illustrates a cross sectional shape 72 similar to that of FIG. 10 but with only one bead 66.

Figure 13:
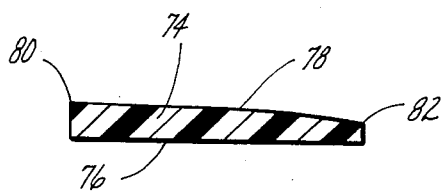
FIG. 13 is a fragmentary half sectional view illustrating a modified form.

FIG. 13 is a half sectional view through an insulating layer 74 illustrating an alternate construction for the taper. Reference numeral 76 identifies the surface which is against the metal strip. The opposite surface 78 has a curved taper extending from a maximum thickness point 80 at the center to a minimum thickness 82 at the outer edge.

Figure 14:
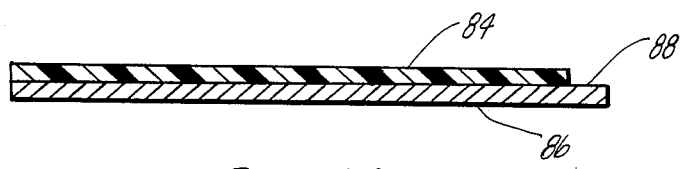
FIG. 14 is a cross sectional view similar to FIG. 1 illustrating another embodiment.
Figure 15:
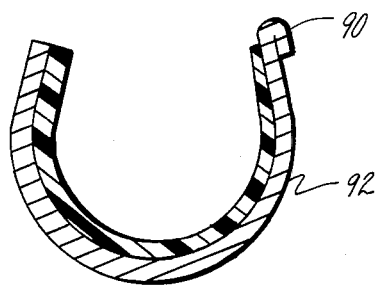
FIG. 15 is a transverse cross sectional view through an edge guard made from the material of FIG. 14.

FIG. 1 illustrates still another construction for extruding the plastic insulation 84 onto the flat metal strip 86. The insulation covers the full extent of one surface of the metal strip except along one marginal edge to leave the area 88 uncovered. In certain instances this may be a desirable manufacturing procedure in that it is necessary to control only one uncovered area 88 and not to have to control the thickness of the plastic so that it does not intrude onto two uncovered areas along opposite edges. In this embodiment the uncovered area 88 is formed into a bead 90 as illustrated in FIG. 15 which illustrates the final cross sectional shape 92 for an edge guard made from the material of FIG. 14. This embodiment presents an exterior metallic appearance, it has one bead 90 for stiffening purposes and it provides full insulation on the interior of the U-shaped cross section to provide protection. Although the drawing illustrates the plastic to be of uniform thickness, it is possible to impart any desired tapered shape to the plastic such as those illustrated above.

The invention provides improvements in edge guards and the manufacture thereof. While a preferred embodiment of the invention has been disclosed, it will be appreciated that principles of the invention are applicable to other embodiments.

What is claimed is:

1. A method of making an edge guard of generally U-shaped cross section having inner and outer legs joined by a generally semi-circular base which comprises passing a flat metal strip through an extruder, extruding plastic onto said strip as it passes through the extruder such that the plastic is applied to produce a tapered cross sectional shape on one face of the strip which is thicker at a central region and narrows toward the side edges of the strip and then forming the strip into the U-shaped cross section such that the taper of the plastic narrows in a direction toward the distal end of each leg and the plastic is disposed on the interior of the U-shaped cross section.

2. A product made by the method of claim 1.

3. A method of making an edge guard of a generally U-shaped cross section having inner and outer legs joined by a generally semi-circular base which comprises passing a flat metal strip through an extruder, extruding plastic onto said strip as it passes through the extruder such that the plastic is applied to produce a tapered cross sectional shape extending between at least one of the side edges of the strip and a central region of the strip, and then forming the strip into the U-shaped cross section such that the taper of the plastic extends at least along the interior of the length of one leg between the distal end of the leg and the semi-circular base.

4. A product made by the method of claim 3.

* * * * *